(12) United States Patent
Saraf

(10) Patent No.: US 12,243,160 B2
(45) Date of Patent: Mar. 4, 2025

(54) METHODS, SYSTEMS AND COMPUTER PROGRAM PRODUCTS FOR IN-APPLICATION VIRTUAL OBJECT SHARING

(71) Applicant: NOW.GG, INC., Campbell, CA (US)

(72) Inventor: Suman Saraf, Gurgaon (IN)

(73) Assignee: NOW.GG, INC., Campbell, CA (US)

( * ) Notice: Subject to any disclaimer, the term of this patent is extended or adjusted under 35 U.S.C. 154(b) by 68 days.

(21) Appl. No.: 17/962,431

(22) Filed: Oct. 7, 2022

(65) Prior Publication Data

US 2023/0111738 A1 Apr. 13, 2023

Related U.S. Application Data

(60) Provisional application No. 63/253,926, filed on Oct. 8, 2021.

(51) Int. Cl.
| | |
|---|---|
| *G06T 15/00* | (2011.01) |
| *G06F 3/04815* | (2022.01) |
| *G06T 17/00* | (2006.01) |
| *G06T 19/00* | (2011.01) |

(52) U.S. Cl.
CPC .......... *G06T 17/00* (2013.01); *G06F 3/04815* (2013.01); *G06T 19/00* (2013.01); *G06T 2219/024* (2013.01)

(58) Field of Classification Search
CPC .............. A63F 13/792; A63F 2300/575; A63F 13/795; A63F 13/69; A63F 3/04815; G06T 17/00; G06T 19/00; G06T 2219/024
USPC ........................................................ 345/415
See application file for complete search history.

(56) References Cited

U.S. PATENT DOCUMENTS

| | | | | |
|---|---|---|---|---|
| 9,183,676 | B2* | 11/2015 | McCulloch | G06T 19/006 |
| 9,895,616 | B2* | 2/2018 | Schindler | G06Q 30/0261 |
| 10,173,141 | B1* | 1/2019 | Schindler | A63F 13/35 |
| 10,528,207 | B2* | 1/2020 | Chen | H04L 65/403 |
| 10,776,425 | B2* | 9/2020 | Micucci | G06F 16/90 |
| 11,249,714 | B2* | 2/2022 | Spivack | A63F 13/69 |
| 11,498,001 | B2* | 11/2022 | Gustafsson | A63F 13/35 |
| 11,960,784 | B2* | 4/2024 | Dudovitch | G06F 3/04845 |

(Continued)

OTHER PUBLICATIONS

Hariri B, Shirmohammadi S, Pakravan Mr. Loader: a location-aware distributed virtual environment architecture. In2008 IEEE Conference on Virtual Environments, Human-Computer Interfaces and Measurement Systems Jul. 1, 20084 (pp. 97-101). IEEE.*

*Primary Examiner* — Phu K Nguyen
(74) *Attorney, Agent, or Firm* — The Webb Law Firm

(57) ABSTRACT

Methods, systems and computer program products for in-application virtual object sharing include (i) responsive to a first acquiring a virtual object recognized by a software application, identifying a first user identifier associated with the first user, (ii) identifying a virtual object identifier associated with the virtual object, (iii) identifying a user group representing a plurality of users including the first user (iv) associating the virtual object identifier with one or more additional user identifiers associated with users within the user group, and (v) updating in a non-transitory memory, a profile corresponding to each user associated with the user group, that also has the virtual object identifier associated with a user identifier corresponding to said user, wherein said update to the profile is based on the properties of the virtual object.

11 Claims, 7 Drawing Sheets

(56) References Cited

U.S. PATENT DOCUMENTS

| | | |
|---|---|---|
| 2013/0178257 A1 | 7/2013 | Langseth |
| 2013/0286004 A1 | 10/2013 | Mcculloch et al. |
| 2013/0339228 A1 | 12/2013 | Shuster et al. |
| 2017/0329864 A1 | 11/2017 | Micucci et al. |
| 2021/0279695 A1 | 9/2021 | Rice |

\* cited by examiner

METHODS, SYSTEMS AND COMPUTER PROGRAM PRODUCTS FOR IN-APPLICATION VIRTUAL OBJECT SHARING

CROSS-REFERENCE TO RELATED APPLICATION

This application claims priority to U.S. Provisional Patent Application No. 63/253,926 filed Oct. 8, 2021, the disclosure of which is hereby incorporated by reference in its entirety.

BACKGROUND OF THE INVENTION

Field of the Invention

The present invention relates to methods, systems and computer program products for in-application virtual object sharing.

Description of Related Art

For the purposes of the invention, the terms "virtual object(s)", "digital object(s)", "virtual item(s)" and "virtual good(s)" shall refer to non-physical objects, non-physical access tokens, and/or non-physical money tokens purchased for use in online communities or online games or other electronic or virtual platforms or forums.

Non-limiting examples of virtual objects of the kind contemplated within this written description may include (i) virtual equipment that a game-player's avatar can use—for example, in case of a humanoid avatar, a helmet, hat, wig, armor, clothing, etc. (ii) weapons that can be used for game play, (iii) other items that the game player may carry, hold, or use, such as potions, scrolls, lock picking equipment, trap enabling/disarming equipment etc., (iv) access passes that grant access to particular platforms, forums, games or regions, maps or levels within any of the above—etc.

Virtual objects are individual/avatar specific and the same virtual object cannot be used by more than one application user/user identity/game player/in-game avatar. There is a need for solutions that address this drawback.

SUMMARY OF THE INVENTION

The invention provides methods, systems and computer program products for in-application virtual object sharing.

In an embodiment, the invention provides a method for in-application virtual object sharing. The method comprises the steps of (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

In another embodiment, the invention provides a system for in-application virtual object sharing, comprising at least a processor, and a memory. The processor may be configured for (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

The invention also provides a computer program product for in-application virtual object sharing, the computer program product comprises a non-transitory computer readable medium having a computer readable program code embodied therein. The computer readable program code comprises instructions for implementing the steps of (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

DESCRIPTION OF THE INVENTION

The invention provides methods, systems and computer program products for in-application virtual object sharing.

Figure 1:
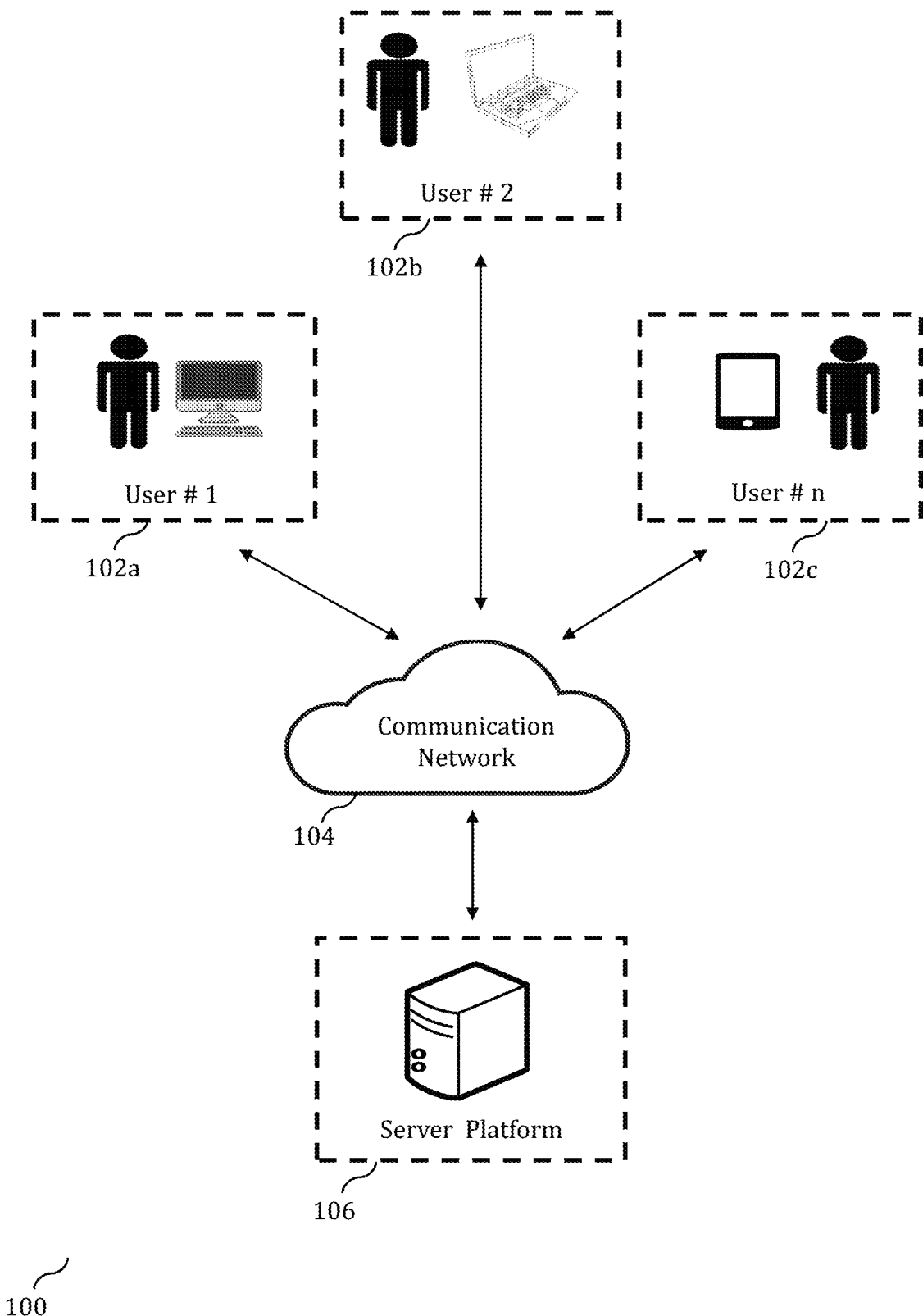
FIG. 1 illustrates an exemplary system environment for implementing access to and use of virtual objects.

FIG. 1 illustrates an exemplary system environment 100 for implementing access to and use of virtual objects.

System environment 100 comprises a server platform 106 comprising one or more computing devices or servers, configured to enable a plurality of users—user #1 102a, user #2 102b, upto user #n 102c to communicate with server platform 106 through communication network 104 (e.g. the internet) for the purposes of receiving software services provided by server platform 106 at or through a client terminal through which the user is accessing server platform 106.

Server platform 106 may be configured to provide cloud based service(s) to a requesting user and/or client terminal or to a software application implemented at the client terminal which is in periodic or continuous network communication with server platform 106. The client terminals associated with any of user #1 to user #n 102a, 102b, 102c may comprise any computing device (including without limitation any of a laptop, desktop, a mobile device and/or a set top box) that interfaces through network 104, with server platform 106.

Figure 2:
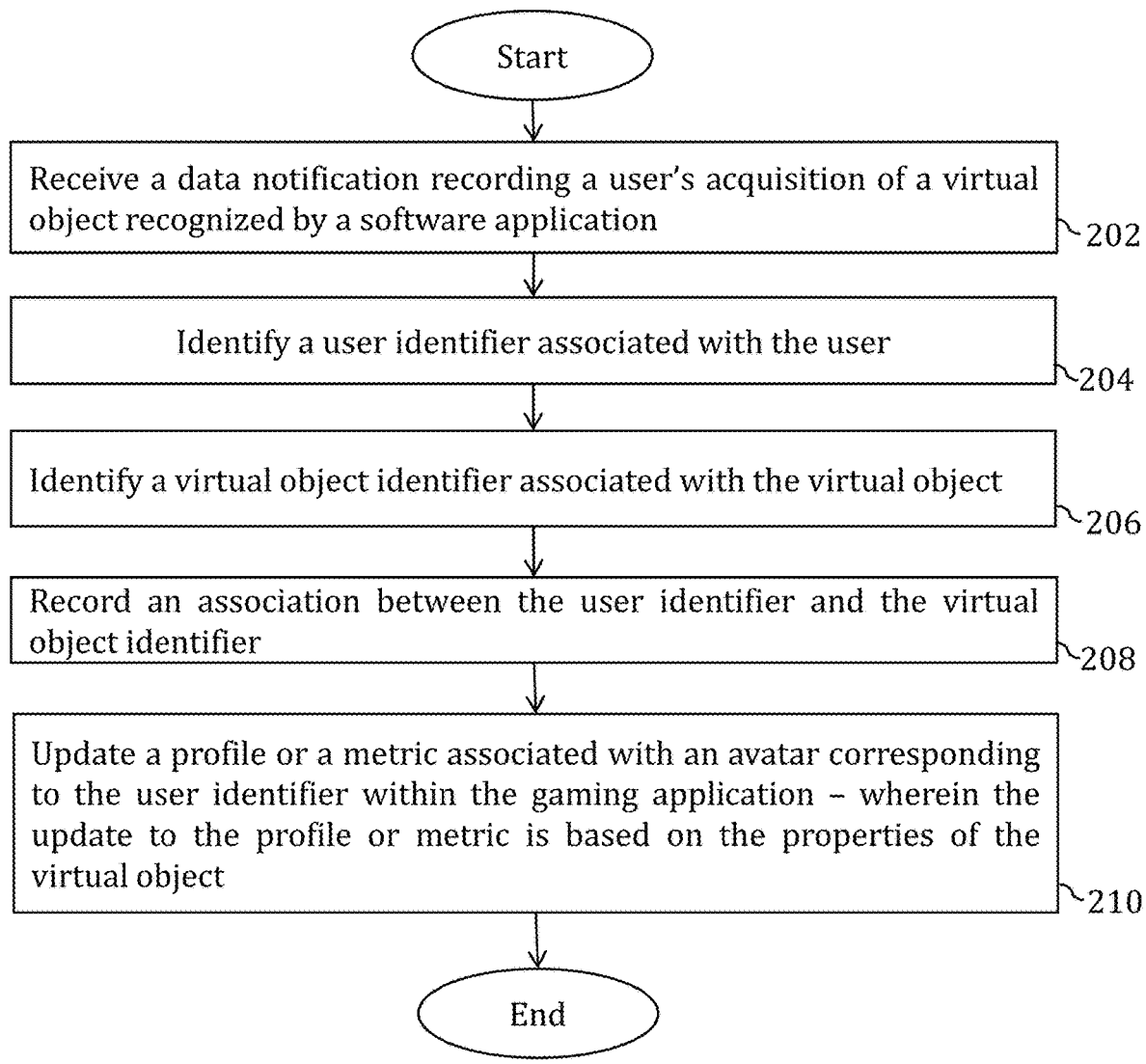
FIG. 2 is a flowchart illustrating an exemplary method for enabling use of virtual objects.

FIG. 2 is a flowchart illustrating an exemplary method for enabling use of virtual objects. In an embodiment the method of FIG. 2 may be implemented within system environment 100 of FIG. 1—and more particularly at server platform 106 within system environment 100.

Step 202 comprises receiving receive at the server platform, a data notification notifying or recording a user's acquisition of a virtual object recognized by a software application.

Step 204 comprises identifying a user identifier associated with the user.

Step 206 comprises identifying a virtual object identifier associated with the virtual object that has been acquired by the user.

Step 208 comprises recording an association between the user identifier and the virtual object identifier—and storing this association in a database. As a result of the stored association, the server platform can at any time in the future identify virtual objects that have been acquired by the user.

Step 210 comprises updating a profile or a metric associated with the user, or with an avatar corresponding to the user identifier within the software application—wherein the update to the profile or metric is based on the properties of the virtual object. For example, if the software application is a first player medieval quest type gaming application, and the acquired virtual object is a health potion that increases game player avatar's health by 5 points, step 210 would comprise updating a profile associated with the acquiring user's—by incrementing the avatar's health parameters by an additional 5 points.

Figure 3:
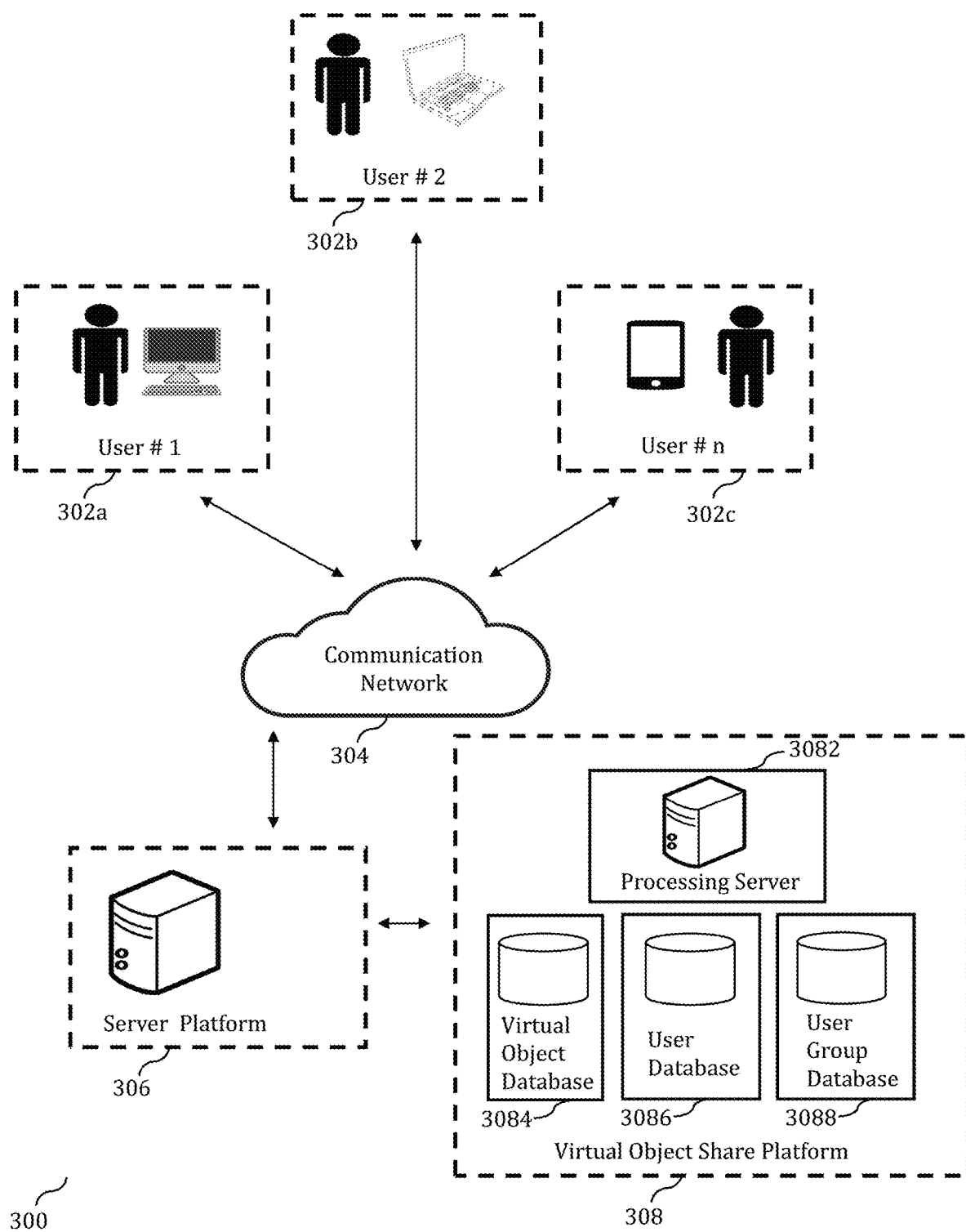
FIG. 3 illustrates a system environment implementing access to and use of virtual objects in accordance with the present invention.

FIG. 3 illustrates a system environment 300 implementing access to and use of virtual objects in accordance with the present invention.

System environment 300 comprises a server platform 306 (for example, a game server platform) comprising one or more computing devices or servers, configured to enable a plurality of users user #1 302a, user #2 302b, upto user #n 302c to communicate with server platform 306 through communication network 304 (e.g. the Internet) for the purposes of receiving software services provided by server platform 306 at or through a client terminal through which the user is accessing server platform 306.

Server platform 306 may be configured to provide cloud based service(s) to a requesting user and/or client terminal or to a software application implemented at the client terminal which is in periodic or continuous network communication with server platform 106. The client terminals associated with any of user #1 to user #n 302a, 302b, 302c may comprise any computing device (including without limitation any of a laptop, desktop, a mobile device and/or a set top box) that interfaces through network 304, with server platform 306.

Server platform 306 is additionally communicably coupled with a virtual object share platform 308 which comprises processing server 3082, virtual object database 3084, user database 3086 and user group database 308. Processing server 3082 may be configured to implement one or more data processing and data communication related functionality associated with virtual object share platform 308.

Virtual object database 3084 is a database configured to store information corresponding to virtual data objects and their respective properties parameters. Virtual object database 3084 may be configured to store data records associated with individual virtual objects—wherein a data record associated with a virtual object may include one or more of virtual object name, virtual object type, name or identifier of a software application within which the virtual object may be accessed or used, and information defining the properties or functionality of the virtual object and/or the manner in which the virtual object changes state information within the software application within which it is accessed or used.

User database 3086 is a database configured to store information corresponding to users that have been registered to access a software application that is implemented or serviced through server platform 306. User database 3086 may be configured to store data records associated with individual users—wherein a data record associated with a user may include one or more of the user name, user avatar name, user login and/or password information, user authentication information, user profile information corresponding to a user profile or avatar associated with the software application, and/or virtual objects that have been acquired by a user for access or use within the software application.

User group database 3088 is a database configured to store information corresponding to user groups that have been generated or registered for sharing of virtual objects in connection with the services provided by server platform 306. User group database 3088 may be configured to store data records associated with user groups—wherein a data record associated with a user group may include at least, a user group name and/or a user group identifier, and a list of user names/user identifiers associated with members of the user group.

Figure 4:
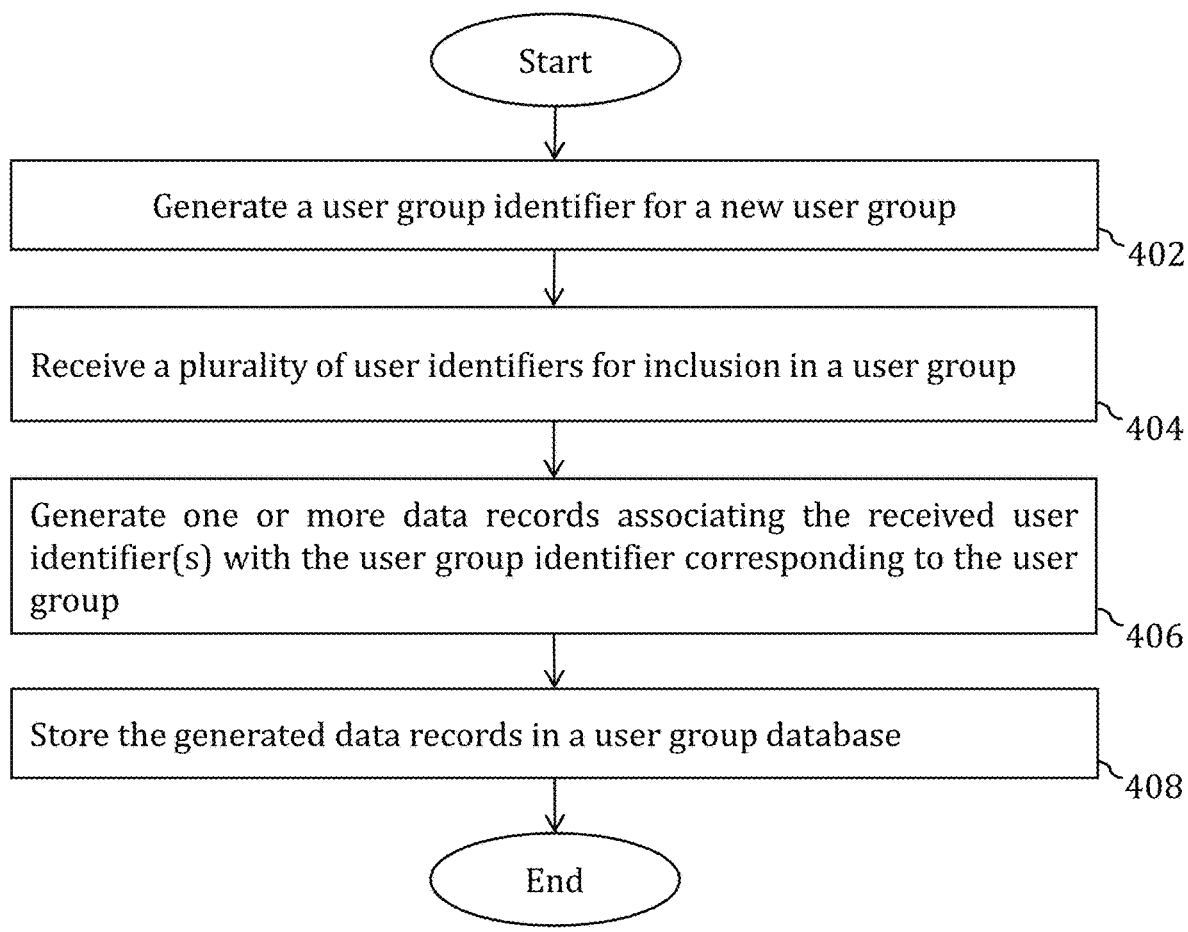
FIGS. 4 to 6 are flowcharts illustrating exemplary methods in accordance with the present invention.

FIG. 4 is a flowchart illustrating a method of generating a user group within the system environment 300. The method of generating a user group may be implemented at server platform 306 or at virtual object share platform 308 or partially at either or both platforms 306, 308.

Step 402 comprises generating a user group identifier for a new user group. The user group identifier may comprise a group name or any other group identifier—and may be generated based on user input, or automatically by a computing device.

Step 404 comprises receiving a plurality of user identifiers for inclusion within the new user group. In an embodiment, the plurality of user identifiers may be selected base on one or more user inputs. In a further embodiment, the user identifiers may each uniquely identify a user authorized to use or access server platform 306 or one or more services or software applications implemented within server platform 306.

Step 406 comprises generating one or more data records associating each of the received user identifier(s) with the user group identifier corresponding to the user group.

Step 408 comprises storing the generated data records in a user group database 3088 within virtual object share platform 308.

Figure 5:
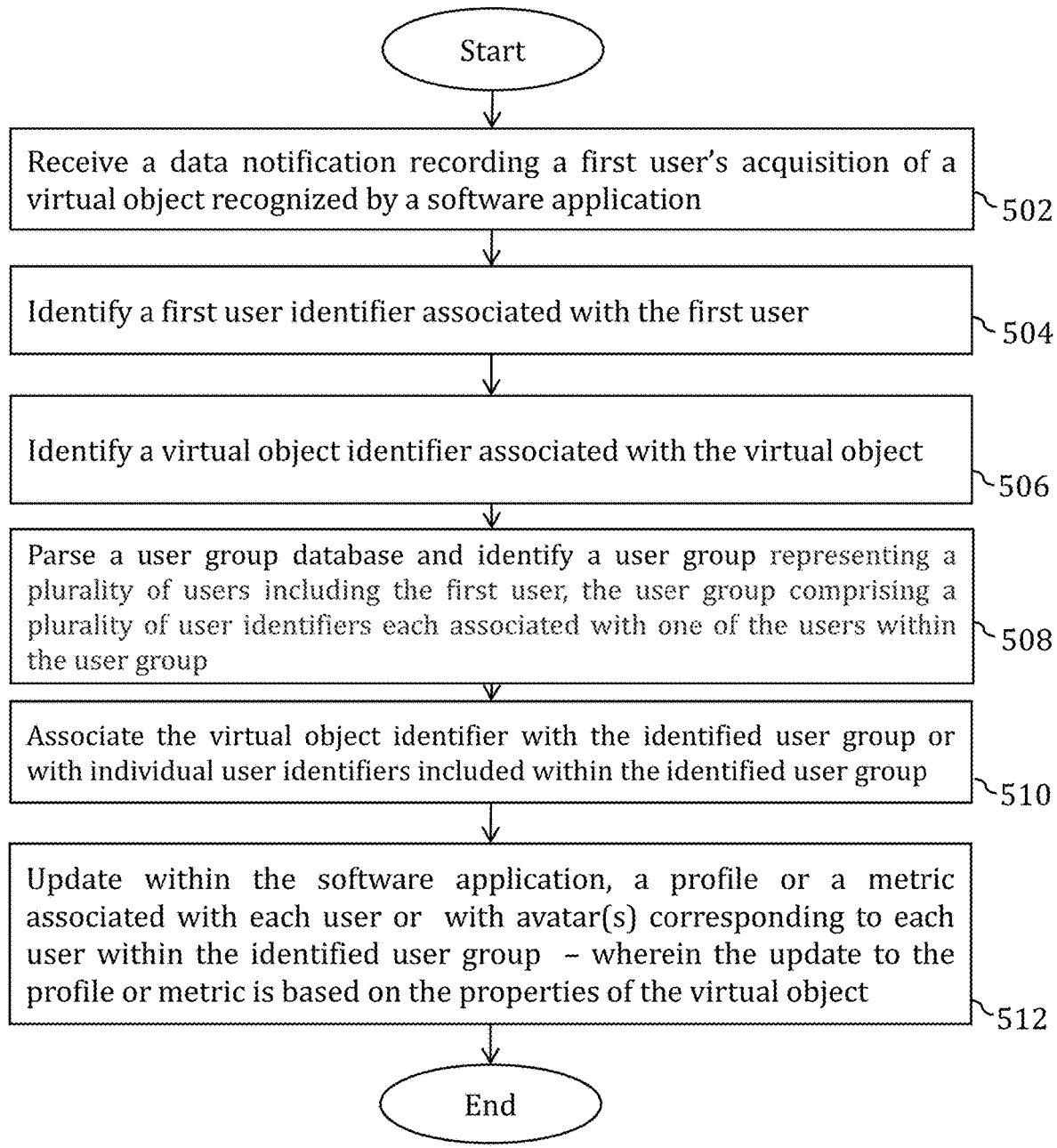

FIG. 5 illustrates a first embodiment of a method for implementing virtual object sharing in accordance with the teachings of the present invention. The method of FIG. 5 may be implemented at server platform 306 or at virtual object share platform 308 or partially at either or both platforms 306, 308.

Step 502 comprises receiving a data notification or data message recording or representing or communicating a first user's acquisition of a virtual object recognized by a software application. In an embodiment the virtual object is acquired by the first user through (i) an interaction with a user interface implemented by the software application at a computer terminal, or (ii) through an interaction within a virtual environment implemented by the software application at a computing device, or (iii) through an interaction within a virtual gaming environment implemented by the software application at a processor implemented gaming device, or (iv) through an interaction within any other processor implemented software application or processor implemented virtual environment, or (iv) by acquiring a unique token representing the virtual object (for example, by purchasing or otherwise acquiring a unique serial number corresponding to the virtual object). In an embodiment where acquisition of the virtual object that is recognized by a software application occurs within the same software application, the data notification or data message recording or representing or communicating the first user's acquisition of the virtual object may be generated in response to any of (i) a user input that is recognized as a trigger for such notification, message or recordal, or (ii) detection of the first user's acquisition of the virtual object by the software application or by a processor implementing the software application. In an embodiment where acquisition of the virtual object that is recognized by a software application occurs outside of the software application (for example within an external software application or another virtual environment, or in the physical world/real world), the data notification or data message recording or representing or communicating the first user's acquisition of the virtual object may be generated in response to a user data input provided to the software application (i.e. the software application that recognizes the virtual object) through a user interface implemented by the software application, or through inter-application data messaging between an external software application/external virtual environment and the software application that recognizes the virtual object.

Step 504 comprises identifying a first user identifier associated with the first user. In an embodiment, the first user identifier may be extracted from the received data notification or data message. The first user identifier may comprise any identifier that uniquely identifies the first user—and in an embodiment may comprise any of a user name, a user identification number, or a unique account identification number associated with the first user.

Step 506 comprises identifying a virtual object identifier associated with the virtual object. In an embodiment, the virtual object identifier may be extracted from the received data notification or data message. The virtual object identifier may comprise any identifier that uniquely identifies the virtual object—and in an embodiment may comprise any of a virtual object name, or a virtual object identification number, or an alphanumeric string uniquely associated with the virtual object unique account identification number associated with the first user.

Step 508 comprises parsing a user group database 3088 and identifying based on parsed data records within the user group database 3088, a user group representing a plurality of users including the first user, wherein the user group comprises a plurality of user identifiers, and wherein each user identifier within the user group is associated with one of the users associated with the user group.

Step 510 comprises associating the virtual object identifier with the identified user group or alternatively with all user identifiers included within the identified user group.

Step 512 comprises updating within the software application, a profile or a metric associated with each user or with avatar(s) corresponding to each user within the identified user group—wherein the update to the profile or metric is based on the properties of the virtual object. In an embodiment, the update to the profile or metric is recorded in a non-transitory memory.

In an embodiment, one or more software services or use related permissions being implemented by the server platform 306 for providing to a user or avatar corresponding to a user (or each user) within the identified user group may (subsequent to implementation of step 510 or 512) be modified or altered based on the update to the profile or metric associated with such user(s) or avatar(s).

In a more particular embodiment, in response to any user that is represented within the identified user group, accessing through a computer terminal any one or more software services that are provided by the software application, the software application delivers the accessed one or more software services at said computer terminal, wherein the delivered one or more software services include software functionality associated with the virtual object. By way of example, if the virtual object is an in-game virtual object, each user within the identified user group accessing the game will be given access to said in-game virtual object in the course of gameplay. In an embodiment, the accessed one or more software services are implemented at the server platform 306 and are streamed or delivered via network communication to the computer terminal that is being accessed by such user within the identified user group.

Figure 6:
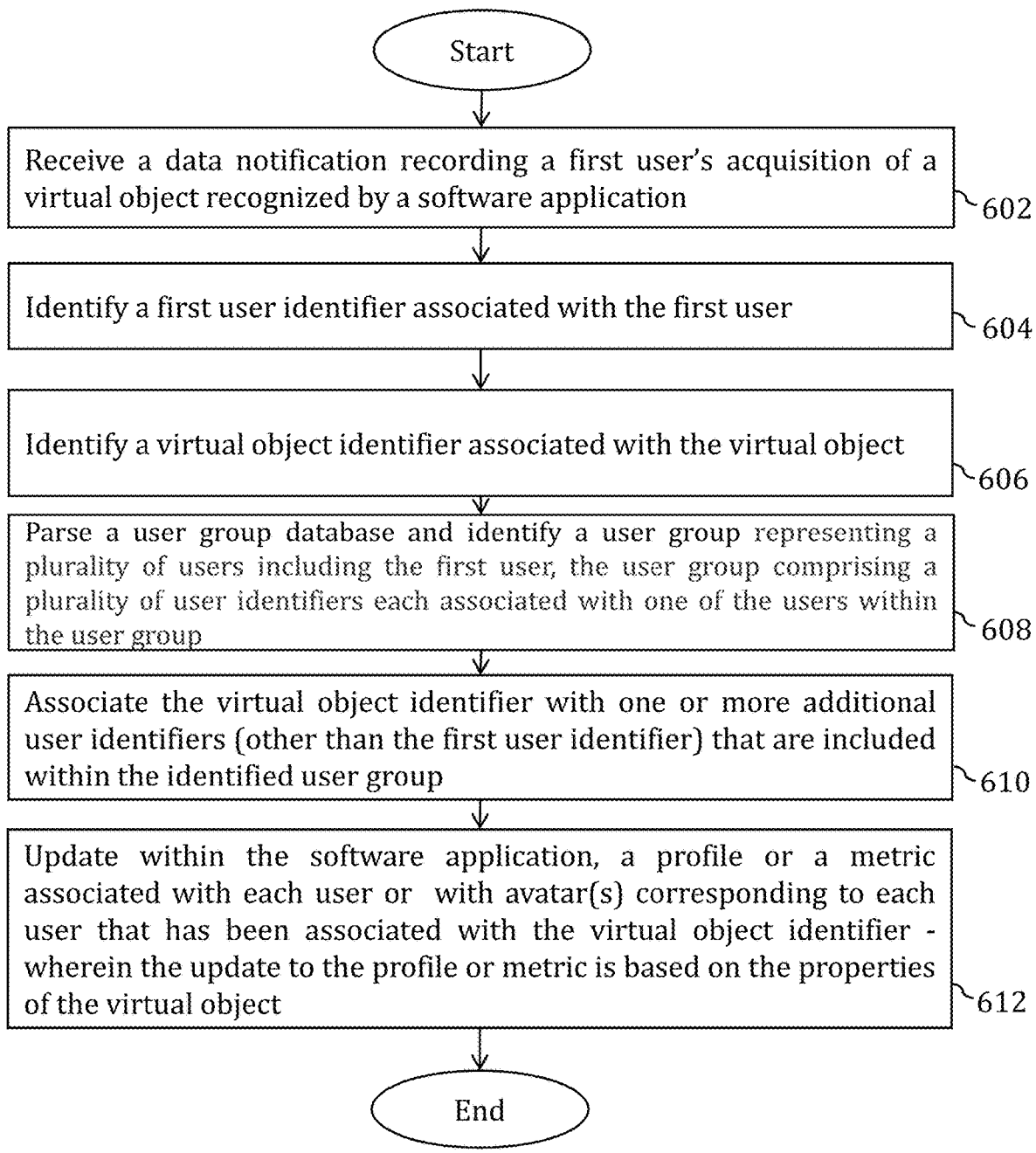

FIG. 6 illustrates a second embodiment of a method for implementing virtual object sharing in accordance with the teachings of the present invention. The method of FIG. 6 may be implemented at server platform 306 or at virtual object share platform 308 or partially at either or both platforms 306, 308.

Step 602 comprises receiving a data notification or data message recording or representing or communicating a first user's acquisition of a virtual object recognized by a software application. In an embodiment the virtual object is acquired by the first user through (i) an interaction with a user interface implemented by the software application at a computer terminal, or (ii) through an interaction within a virtual environment implemented by the software application at a computing device, or (iii) through an interaction within a virtual gaming environment implemented by the software application at a processor implemented gaming device, or (iv) through an interaction within any other processor implemented software application or processor implemented virtual environment, or (iv) by acquiring a unique token representing the virtual object (for example, by purchasing or otherwise acquiring a unique serial number corresponding to the virtual object). In an embodiment where acquisition of the virtual object that is recognized by a software application occurs within the same software application, the data notification or data message recording or representing or communicating the first user's acquisition of the virtual object may be generated in response to any of (i) a user input that is recognized as a trigger for such notification, message or recordal, or (ii) detection of the first user's acquisition of the virtual object by the software application or by a processor implementing the software application. In an embodiment where acquisition of the virtual object that is recognized by a software application occurs outside of the software application (for example within an external software application or another virtual environment, or in the physical world/real world), the data notification or data message recording or representing or communicating the first user's acquisition of the virtual object may be generated in response to a user data input provided to the software application (i.e. the software application that recognizes the virtual object) through a user interface implemented by the software application, or through inter-application data messaging between an external software application/external virtual environment and the software application that recognizes the virtual object.

Step 604 comprises identifying a first user identifier associated with the first user. In an embodiment, the first user identifier may be extracted from the received data notification or data message. The first user identifier may comprise any identifier that uniquely identifies the first user—and in an embodiment may comprise any of a user name, a user identification number, or a unique account identification number associated with the first user.

Step 606 comprises identifying a virtual object identifier associated with the virtual object. In an embodiment, the virtual object identifier may be extracted from the received data notification or data message. The virtual object identifier may comprise any identifier that uniquely identifies the virtual object—and in an embodiment may comprise any of a virtual object name, or a virtual object identification number, or an alphanumeric string uniquely associated with the virtual object unique account identification number associated with the first user.

Step 608 comprises parsing a user group database 3088 and identifying based on parsed data records within the user group database 3088, a user group Representing a plurality of users including the first user, wherein the user group comprises a plurality of user identifiers, and wherein each user identifier within the user group is associated with one of the users associated with the user group.

Step 610 comprises associating the virtual object identifier with one or more additional user identifiers (other than the first user identifier) that are included within the identified user group.

Step 612 comprises updating within the software application, a profile or a metric associated with each user or with avatar(s) corresponding to each additional user that has been associated with the virtual object identifier—wherein the update to the profile or metric is based on the properties of the virtual object.

In an embodiment, one or more software services or use related permissions being implemented by the server platform 306 for providing to a user or avatar corresponding to each additional user that has been associated with the virtual object identifier may (subsequent to implementation of step 610 or 612) be modified or altered based on the update to the profile or metric associated with such user or avatar.

In a more particular embodiment, in response to any additional user (within the identified user group) that has been associated with the virtual object identifier, accessing one or more software services that are provided by the software application, the software application delivers the accessed one or more software services at said computer terminal, wherein the delivered one or more software services include software functionality associated with the virtual object. By way of example, if the virtual object is an in-game virtual object, each such additional user group accessing the game will be given access to said in-game virtual object in the course of gameplay. In an embodiment, the accessed one or more software services are implemented at the server platform 306 and are streamed or delivered via network communication to the computer terminal that is being accessed by such user within the identified user group.

As a consequence of implementing the methods of FIG. 5 or FIG. 6, the properties or user or access permissions associated with a virtual object acquired by a first user within a user group are extended can be extended to some or all other users within the user group as well—without requiring each such user to individually acquire the virtual object.

The virtual object may be purchased, found or acquired within or through the software application or gaming application in which it can be applied, or alternatively can be acquired even outside of the software application or gaming application in which it can be applied.

In an embodiment, the invention provides a method for in-application virtual object sharing. The method comprises the steps of (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

In a further embodiment of the method, the virtual object is acquired by the first user through any of (i) an interaction with a user interface implemented by the software application at a computer terminal, (ii) an interaction within a virtual environment implemented by the software application at a computing device, (iii) an interaction within a virtual gaming environment implemented by the software application at a processor implemented gaming device, (iv) an interaction within any other processor implemented software application or processor implemented virtual environment, or (v) acquisition of a token representing the virtual object.

In another method embodiment, the virtual object identifier is also associated with the first user identifier.

In a more particular embodiment of the method, the virtual object identifier is associated with all user identifiers within, the user group.

In a specific embodiment of the method, responsive to any user user that is represented within the identified user group, accessing through a computer terminal, one or more software services that are provided by the software application (i) the software application delivers the accessed one or more software services at the computer terminal, and (ii) the delivered one or more software services include software functionality associated with the virtual object.

In another embodiment, the invention provides a system for in-application virtual object sharing, comprising at least a processor, and a memory. The processor may be configured for (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

In another embodiment of the system, the processor is configured such that the virtual object is acquired by the first user through any of (i) an interaction with a user interface implemented by the software application at a computer terminal, (ii) an interaction within a virtual environment implemented by the software application at a computing device, (iii) an interaction within a virtual gaming environment implemented by the software application at a processor implemented gaming device, (iv) an interaction within any other processor implemented software application or processor implemented virtual environment, or (v) acquisition of a token representing the virtual object.

In yet another embodiment of the system, the virtual object identifier is also associated with the first user identifier.

In a particular embodiment, the system is configured such that the virtual object identifier is associated with all user identifiers within, the user group.

In a more specific embodiment, the system is configured such that responsive to any user user that is represented within the identified user group, accessing through a computer terminal, one or more software services that are provided by the software application (i) the software application delivers the accessed one or more software services at the computer terminal, and (ii) the delivered one or more software services include software functionality associated with the virtual object.

The invention also provides a computer program product for in-application virtual object sharing, the computer program product comprises a non-transitory computer readable medium having a computer readable program code embodied therein. The computer readable program code comprises instructions for implementing the steps of (i) responsive to a determination that a first user has acquired a virtual object recognized by a software application, identifying a first user identifier associated with the first user, (ii) identifying a virtual object identifier associated with the virtual object, (iii) identifying a user group representing a plurality of users including the first user, wherein the user group comprises a plurality of user identifiers, and each user identifier within the user group is associated with one of the users within the user group, (iv) associating the virtual object identifier with one or more additional user identifiers from among the plurality of user identifiers within the user group, each additional identifier being associated with an additional user associated with the user group, wherein said additional user is distinct from the first user, and (v) updating in a non-transitory memory, a profile corresponding to each user associated with the user group, that also has the virtual object identifier associated with a user identifier corresponding to said user, wherein said update to the profile is based on the properties of the virtual object.

Figure 7:
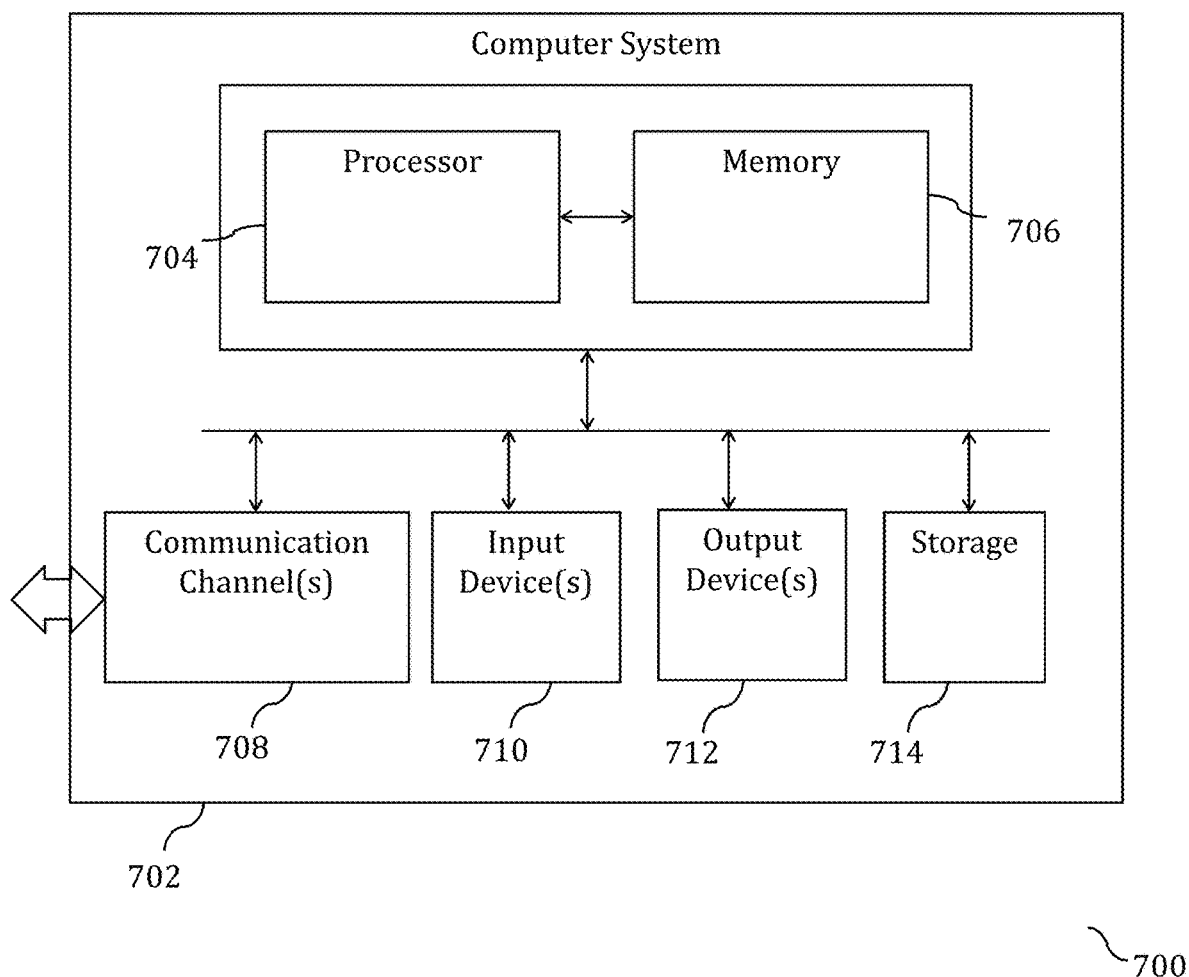
FIG. 7 illustrates an exemplary computer system that is capable of implementing the present invention.

FIG. 7 illustrates an exemplary computer system that is capable of implementing the present invention.

FIG. 7 illustrates an exemplary computer system that is capable of implementing the present invention.

The illustrated system comprises computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above described system and method embodiments, the present invention provides methods, systems and computer program products for in-application virtual object sharing.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for in-application sharing of a virtual object, the method comprising the steps of:
    responsive to a determination that a first user has acquired a virtual object recognized by a software application, identifying a first user identifier associated with the first user,
    wherein the virtual object is an item that implements changes to state information associated with a user that has acquired said virtual object;
    identifying a virtual object identifier associated with the virtual object;
    identifying from data previously stored within a database, a stored user group representing a plurality of users, wherein the user group comprises a plurality of user identifiers, and each user identifier within the user group is associated with one of the plurality of users within the user group, and wherein the plurality of users includes the first user;
    associating the virtual object identifier with one or more additional user identifiers from among the plurality of user identifiers within the user group, each additional identifier being associated with an additional user associated with the user group, wherein said additional user is distinct from the first user; and
    updating in a non-transitory memory, a profile corresponding to each user that is associated with the user group, and that has the virtual object identifier associated with a user identifier corresponding to said user, wherein said update to the profile is based on the properties of the virtual object,
    wherein the software application is configured such that, during execution of the application, state information corresponding to each user that (i) is associated with the user group, and (ii) whose profile has been updated based on the properties of the virtual object, and (iii) who is using the application, is changed based on the virtual object acquired by the first user.

2. The method as claimed in claim 1, wherein the virtual object is acquired by the first user through any of:
    an interaction with a user interface implemented by the software application at a computer terminal;
    an interaction within a virtual environment implemented by the software application at a computing device;
    an interaction within a virtual gaming environment implemented by the software application at a processor implemented gaming device;
    an interaction within any other processor implemented software application or processor implemented virtual environment; or
    acquisition of a token representing the virtual object.

3. The method as claimed in claim 1, wherein the virtual object identifier is also associated with the first user identifier.

4. The method as claimed in claim 1, wherein the virtual object identifier is associated with all user identifiers within the user group.

5. The method as claimed in claim 1, wherein responsive to any user user that is represented within the identified user group, accessing through a computer terminal, one or more software services that are provided by the software application:
    the software application delivers the accessed one or more software services at the computer terminal; and
    the delivered one or more software services include software functionality associated with the virtual object.

6. A system for in-application sharing of a virtual object, comprising:
    a processor; and
    a memory;
    wherein the processor is configured for:

responsive to a determination that a first user has acquired a virtual object recognized by a software application, identifying a first user identifier associated with the first user, wherein the virtual object is an item that implements changes to state information associated with a user that has acquired said virtual object;

identifying a virtual object identifier associated with the virtual object;

identifying from data previously stored within a database, a stored user group representing a plurality of users, wherein the user group comprises a plurality of user identifiers, and each user identifier within the user group is associated with one of the plurality of users within the user group, and wherein the plurality of users includes the first user;

associating the virtual object identifier with one or more additional user identifiers from among the plurality of user identifiers within the user group, each additional identifier being associated with an additional user associated with the user group, wherein said additional user is distinct from the first user; and updating in a non-transitory memory, a profile corresponding to each user that is associated with the user group, and that has the virtual object identifier associated with a user identifier corresponding to said user, wherein said update to the profile is based on the properties of the virtual object, wherein the software application is configured such that, during execution of the application, state information corresponding to each user that (i) is associated with the user group, and (ii) whose profile has been updated based on the properties of the virtual object, and (iii) who is using the application, is changed based on the virtual object acquired by the first user.

7. The system as claimed in claim 6, wherein the processor is configured such that the virtual object is acquired by the first user through any of:

an interaction with a user interface implemented by the software application at a computer terminal;

an interaction within a virtual environment implemented by the software application at a computing device;

an interaction within a virtual gaming environment implemented by the software application at a processor implemented gaming device;

an interaction within any other processor implemented software application or processor implemented virtual environment; or acquisition of a token representing the virtual object.

8. The system as claimed in claim 6, wherein the virtual object identifier is also associated with the first user identifier.

9. The system as claimed in claim 6, wherein the virtual object identifier is associated with all user identifiers within the user group.

10. The system as claimed in claim 6, configured such that responsive to any user that is represented within the identified user group, accessing through a computer terminal, one or more software services that are provided by the software application:

the software application delivers the accessed one or more software services at the computer terminal; and the delivered one or more software services include software functionality associated with the virtual object.

11. A computer program product for in-application sharing of a virtual object, the computer program product comprising a non-transitory computer readable medium having a computer readable program code embodied therein, the computer readable program code comprising instructions for implementing the steps of:

responsive to a determination that a first user has acquired a virtual object recognized by a software application, identifying a first user identifier associated with the first user, wherein the virtual object is an item that implements changes to state information associated with a user that has acquired said virtual object;

identifying a virtual object identifier associated with the virtual object;

identifying from data previously stored within a database, a stored user group representing a plurality of users, wherein the user group comprises a plurality of user identifiers, and each user identifier within the user group is associated with one of the plurality of users within the user group, and wherein the plurality of users includes the first user;

associating the virtual object identifier with one or more additional user identifiers from among the plurality of user identifiers within the user group, each additional identifier being associated with an additional user associated with the user group, wherein said additional user is distinct from the first user; and updating in a non-transitory memory, a profile corresponding to each user that is associated with the user group, and that has the virtual object identifier associated with a user identifier corresponding to said user, wherein said update to the profile is based on the properties of the virtual object, wherein the software application is configured such that, during execution of the application, state information corresponding to each user that (i) is associated with the user group, and (ii) whose profile has been updated based on the properties of the virtual object, and (iii) who is using the application, is changed based on the virtual object acquired by the first user.

* * * * *

UNITED STATES PATENT AND TRADEMARK OFFICE
CERTIFICATE OF CORRECTION

| | | |
|---|---|---|
| PATENT NO. | : 12,243,160 B2 | Page 1 of 1 |
| APPLICATION NO. | : 17/962431 | |
| DATED | : March 4, 2025 | |
| INVENTOR(S) | : Suman Saraf | |

It is certified that error appears in the above-identified patent and that said Letters Patent is hereby corrected as shown below:

On the Title Page

Item (56) Column 2, Other Publications, Line 4, delete "1, 20084" and insert -- 14, 2008 --

Signed and Sealed this
Twenty-ninth Day of April, 2025

Coke Morgan Stewart
*Acting Director of the United States Patent and Trademark Office*